United States Patent
Asahina et al.

(10) Patent No.: US 10,059,060 B2
(45) Date of Patent: Aug. 28, 2018

(54) THREE-DIMENSIONAL PRINTING APPARATUS

(71) Applicant: Roland DG Corporation, Hamamatsu-shi, Shizuoka (JP)

(72) Inventors: Yoshimitsu Asahina, Hamamatsu (JP); Daisuke Akimoto, Hamamatsu (JP); Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 456 days.

(21) Appl. No.: 14/856,602

(22) Filed: Sep. 17, 2015

(65) Prior Publication Data
US 2016/0082663 A1 Mar. 24, 2016

(30) Foreign Application Priority Data
Sep. 18, 2014 (JP) ................. 2014-190407

(51) Int. Cl.
| | |
|---|---|
| B29C 41/22 | (2006.01) |
| B29C 67/00 | (2017.01) |
| B33Y 30/00 | (2015.01) |
| B33Y 50/02 | (2015.01) |
| B29C 64/129 | (2017.01) |
| B29C 64/386 | (2017.01) |

(52) U.S. Cl.
CPC ........ B29C 67/0088 (2013.01); B29C 64/129 (2017.08); B29C 64/386 (2017.08); B33Y 30/00 (2014.12); B33Y 50/02 (2014.12)

(58) Field of Classification Search
CPC ......... B33Y 30/00; B33Y 50/02; B29C 64/20; B29C 64/227; B29C 64/232; B29C 64/245; B29C 64/393
USPC ................................................... 425/375
See application file for complete search history.

(56) References Cited

U.S. PATENT DOCUMENTS

| | | | | |
|---|---|---|---|---|
| 9,327,449 | B2 * | 5/2016 | Ding | B33Y 30/00 |
| 2002/0155189 | A1 * | 10/2002 | John | B33Y 30/00 |
| | | | | 425/174.4 |
| 2006/0111807 | A1 * | 5/2006 | Gothait | B33Y 30/00 |
| | | | | 700/119 |

(Continued)

FOREIGN PATENT DOCUMENTS

JP 4916392 B2 4/2012

*Primary Examiner* — Robert B Davis
*Assistant Examiner* — Thu Khanh T Nguyen
(74) *Attorney, Agent, or Firm* — Keating & Bennett, LLP

(57) ABSTRACT

A three-dimensional printing apparatus includes a movable member with a holder secured thereto, a sensor detecting whether a position of the movable member is equal to or higher than a first position or is lower than the first position, a storage device storing an origin position lower than the first position by a first distance, and a determination device determining whether deviation from the origin position has occurred. The determination device includes a first moving unit moving the movable member to the origin position, a second moving unit moving the movable member toward a second position, which is higher than the origin position by a sum of the first distance and a second distance, and a first determination unit determining that deviation from the origin position has occurred unless the sensor detects that the position of the movable member is equal to or higher than the first position before the movable member reaches the second position.

14 Claims, 8 Drawing Sheets

(56) References Cited

U.S. PATENT DOCUMENTS

2010/0156003 A1* 6/2010 Wahlstrom ............ B33Y 40/00
                                                    264/401
2015/0147424 A1* 5/2015 Bibas ..................... B33Y 50/02
                                                    425/150

* cited by examiner

THREE-DIMENSIONAL PRINTING APPARATUS

The present application claims priority to Japanese Patent Application No. 2014-190407 filed on Sep. 18, 2014, which is incorporated by reference herein in its entirety.

BACKGROUND OF THE INVENTION

1. Field of the Invention

The present invention relates to a three-dimensional printing apparatus, and in more detail, to a three-dimensional printing apparatus that produces a three-dimensional printing object by use of a photocurable resin that is cured by being irradiated with light.

2. Description of the Related Art

Conventionally, three-dimensional printing apparatuses that produce a three-dimensional printing object by use of a photocurable resin are known. A "photocurable resin" is a resin that has a property of being cured by being irradiated with light such as visible light, ultraviolet light or the like, and is liquid in an uncured state.

One of such three-dimensional printing apparatuses is, for example, a suspension stacking system. A three-dimensional printing apparatus of the suspension stacking system stacks, while suspending, photocurable resin layers cured to have a predetermined cross-sectional shape to perform printing. Such an apparatus produces a three-dimensional printing object in the following procedure. First, a photocurable resin in a liquid state is stored in a container including a light-transmissive plate as a bottom plate. Next, a holder that is to act as a base table for a three-dimensional printing object to be produced is located in the photocurable resin. Then, the light-transmissive plate is irradiated with light by a projector or the like. As a result, a portion of the photocurable resin, located between the holder and the light-transmissive plate, that has been irradiated with the light is cured. Thus, a cured layer is formed on a bottom surface of the holder. Next, the holder is moved upward to peel off the cured layer from the light-transmissive plate. Then, the light-transmissive plate is irradiated with light. As a result, a portion of the photocurable resin, located between the cured layer and the light-transmissive plate, that has been irradiated with light is cured. Thus, another cured layer is formed below the cured layer first formed. Then, such an operation is repeated to produce a three-dimensional printing object including a plurality of cured layers that are stacked.

The above-described three-dimensional printing apparatus of the suspension stacking system produces a three-dimensional printing object by stacking the cured layers in repetition. Therefore, in order to produce a three-dimensional printing object with high precision, the precision with which each cured layer is produced is important. The precision of the thickness of each cured layer depends on the precision of the height of a movable member (hereinafter, the height of a movable member will be referred to as the "position of the movable member"). An error in the position of the movable member causes an error in the thickness of the cured layer. The position of the movable member is determined by the height thereof from a predetermined origin position. Upward and downward movements of the movable member are controlled on the basis of the origin position.

However, with the above-described production of a three-dimensional printing object, when the cured layer is formed, the cured layer and the light-transmissive plate are in close contact with each other. Therefore, when the cured layer is peeled off from the light-transmissive plate, a load is applied to the movable member. This load may possibly deviate the origin position of the movable member. The conventional three-dimensional printing apparatus has a problem that an operator cannot check whether or not deviation from the origin position has occurred.

SUMMARY OF THE INVENTION

Preferred embodiments of the present invention provide a three-dimensional printing apparatus capable of detecting a deviation from an origin position of a movable member.

Other preferred embodiments of the present invention provide a three-dimensional printing apparatus that solves the deviation from the origin position of the movable member.

A three-dimensional printing apparatus according to a preferred embodiment of the present invention includes a base member that supports a container including a bottom plate that allows light to pass therethrough; a light source that emits light toward a photocurable resin stored in the container; a holder that is located above the container and suspends the photocurable resin in a cured state; a column provided on the base member; a movable member that is attached to the column so as to be movable upward and downward and has the holder secured thereto; a driving device that is coupled to the movable member and drives the movable member upward and downward; a sensor that detects whether a position of the movable member is equal to or higher than a first position or is lower than the first position; a storage device that stores an origin position set at a position lower than the first position by a first distance; and a determination device that determines whether or not deviation from the origin position has occurred. The determination device includes a first moving unit configured or programmed to control the driving device to move the movable member to the origin position stored in the storage device; a second moving unit configured or programmed to control the driving device to move the movable member toward a second position, which is higher than the origin position stored in the storage device by a total distance of the first distance and a second distance; and a first determination unit configured or programmed to determine that deviation from the origin position stored in the storage device has occurred unless the sensor detects that the position of the movable member is equal to or higher than the first position before the movable member reaches the second position.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, examples of preferred embodiments of three-dimensional printing apparatuses will be described in detail with reference to the attached drawings.

Figure 1:
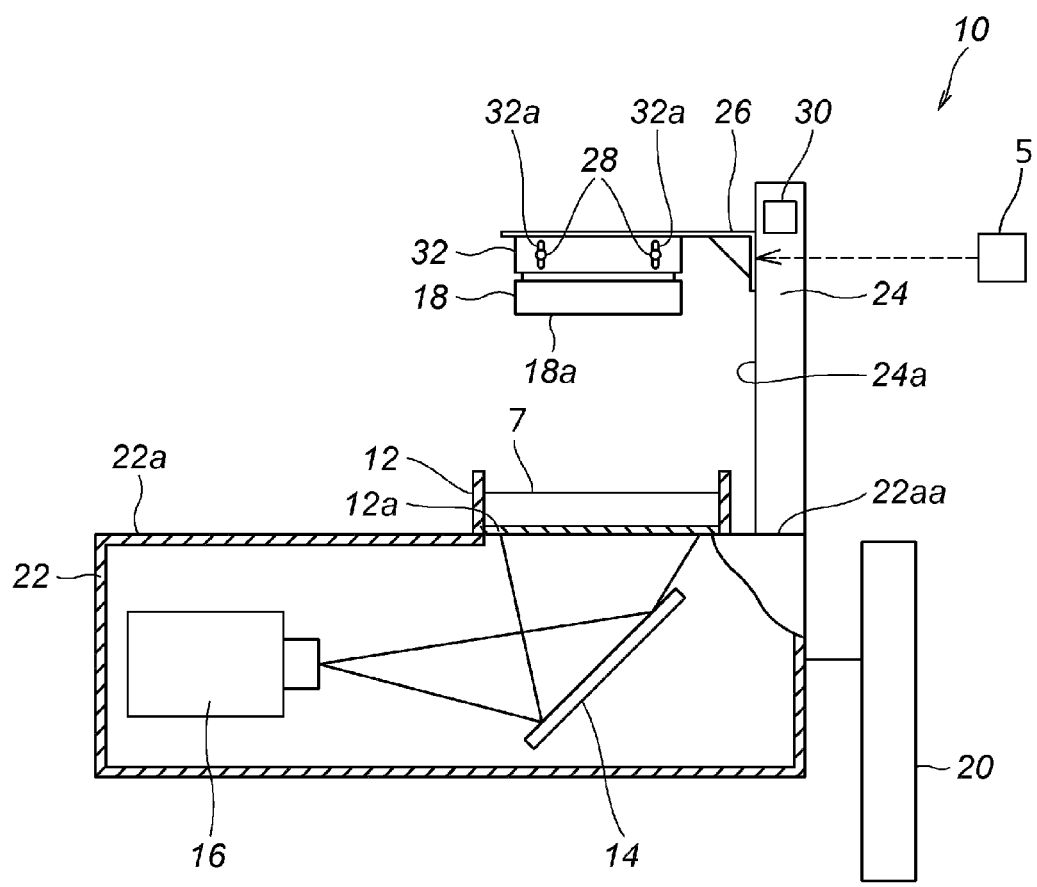
FIG. 1 is a structural view of a three-dimensional printing apparatus.

A three-dimensional printing apparatus 10 shown in FIG. 1 includes a container 12 that stores a photocurable resin 7 in a liquid state, a base member 22 that supports the container 12, a projector 16 as an example of a light source, a holder 18 that suspends the photocurable resin 7 in a cured state, a column 24 provided on the base member 22, a movable member 26 attached to the column 24 so as to be movable upward and downward and has the holder 18 secured thereto, a driving device 5 that is coupled to the movable member 26 and drives the movable member 26 upward and downward, a sensor 30 that detects the position of the movable member 26, and a microcomputer 20.

The container 12 is located on a top surface 22a of the base member 22. A bottom plate 12a of the container 12 includes a light-transmissive plate that transmits light from the projector 16. A top surface of the bottom plate 12a is coated with a light-transmissive coating material in order to improve the peelability of the photocurable resin 7 in the cured state. The coating material is, for example, a silicone resin. The coating material is not absolutely necessary.

The projector 16 is located inside the base member 22. There is no specific limitation on the position of the projector 16. Light from the projector 16 is reflected by a mirror 14 and then is directed toward the bottom plate 12a. The light from the projector 16 passes through the bottom plate 12a and is directed toward the photocurable resin 7 stored in the container 12. The projector 16 projects images based on image data, output from the microcomputer 20, toward the photocurable resin 7 in the container 12. The images projected by the projector 16 are images of a plurality of cross-sectional shapes of a three-dimensional printing object. The projector 16 sequentially projects the images of the plurality of cross-sectional shapes. In other words, the projector 16 projects an image for one layer at a certain time interval. This operation of the projector 16 is controlled by the microcomputer 20.

The holder 18 is driven by the driving device 5 and is movable upward and downward. In this preferred embodiment, the driving device 5 preferably is a servo motor, for example. The holder 18 is capable of suspending the photocurable resin 7 in the cured state, and defines and functions as a base table that holds a three-dimensional printing object. The holder 18 supports the photocurable resin 7 cured in the container 12. The holder 18 is formed of, for example, a metal material such as aluminum or the like. A bottom surface 18a of the holder 18 may be roughened to provide minute concave and convex portions in order to improve the adhesiveness with the photocurable resin 7 in the cured state.

The holder 18 is provided on the column 24 that is secured to a rear end portion 22aa of the top surface 22a of the base member 22. The holder 18 is movable upward and downward. The movable member 26 is provided on a front surface 24a of the column 24. The holder 18 is secured to the movable member 26 with screws 28, for example. The holder 18 is secured with the screws 28 to a securing portion 32 that is provided on the movable member 26. The securing portion 32 is provided with two long holes 32a in a left surface (the side seen in FIG. 1) and two long holes 32a in a right surface (the side opposite to the side seen in FIG. 1). The holder 18 is secured to the securing portion 32 with the screws 28 inserted into the long holes 32a. The holder 18 is movable upward and downward in front of the column 24.

The column 24 is provided with a sensor 30 that detects the position of the movable member 26 (i.e., the height of the movable member 26). The sensor 30 detects whether the position of the movable member 26 is equal to or higher than a first position P1 or is lower than the first position P1. There is no specific limitation on the configuration or the characteristics of the sensor 30. In this preferred embodiment, the sensor 30 preferably outputs an "ON" signal to the microcomputer 20 in the case where the position of the movable member 26 is equal to or higher than the first position P1, and outputs an "OFF" signal to the microcomputer 20 when the position of the movable member 26 is lower than the first position P1. The sensor 30 may be, for example, a touch sensor that outputs an "ON" signal or an "OFF" signal when touching a portion of the movable member 26, or a non-contact sensor such as an optical sensor or the like.

Figure 2:
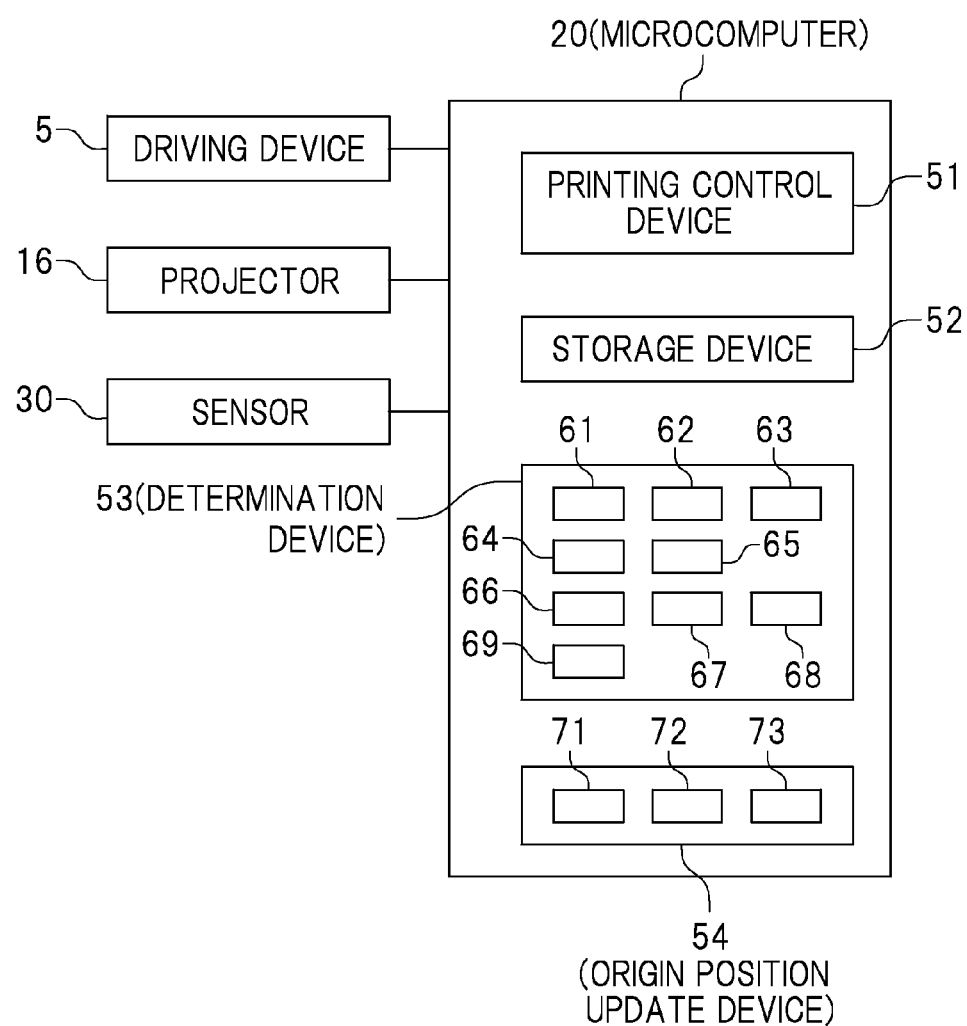
FIG. 2 is a functional block diagram of a microcomputer.

The microcomputer 20 is configured or programmed to control the overall operation of the three-dimensional printing apparatus 10. The microcomputer 20 controls the driving device 5 and the projector 16. As shown in FIG. 2, the microcomputer 20 is configured or programmed to include a printing control device 51 that controls the driving device 5 and the projector 16 to produce a three-dimensional printing object. The microcomputer 20 is configured or programmed to further include a storage device 52 that stores an origin position P0 described below, a determination device 53 that determines whether or not deviation from the origin position P0 stored in the storage device 52 has occurred, and an origin position update device 54 that rewrites the origin position P0 stored in the storage device 52 with a new origin position P0. The printing control device 51, the storage device 52, the determination device 53 and the origin position update device 54 may be defined by hardware, or may be functionally implemented by the microcomputer 20 executing a computer program.

The determination device 53 includes a first moving unit 61, a second moving unit 62, a third moving unit 63, a first stop unit 64, a second stop unit 65, a first determination unit 66, a second determination unit 67, a third determination unit 68, and a calculation unit 69. The origin position update device 54 includes a re-moving unit 71, a downward moving unit 72, and an update unit 73. A program or programs which is/are operated or executed in the microcomputer 20 to define one or more of the first moving unit 61, the second moving unit 62, the third moving unit 63, the first stop unit 64, the second stop unit 65, the first determination unit 66, the second determination unit 67, the third determination unit 68, the calculation unit 69, the re-moving unit 71, the downward moving unit 72, and the update unit 73, preferably is a program (program causing a computer to function) controlling the microcomputer 20, in order to realize functions of the first moving unit 61, the second moving unit 62, the third moving unit 63, the first stop unit 64, the second stop unit 65, the first determination unit 66, the second determination unit 67, the third determination unit 68, the calculation unit 69, the re-moving unit 71, the downward moving unit 72, and the update unit 73, according to various preferred embodiments of the present invention, including each of various circuitry of the microcomputer 20. Processes performed by the above-described units will be described below.

Now, a non-limiting example of a method for producing a three-dimensional printing object by the three-dimensional printing apparatus 10 will be described.

Figure 3:
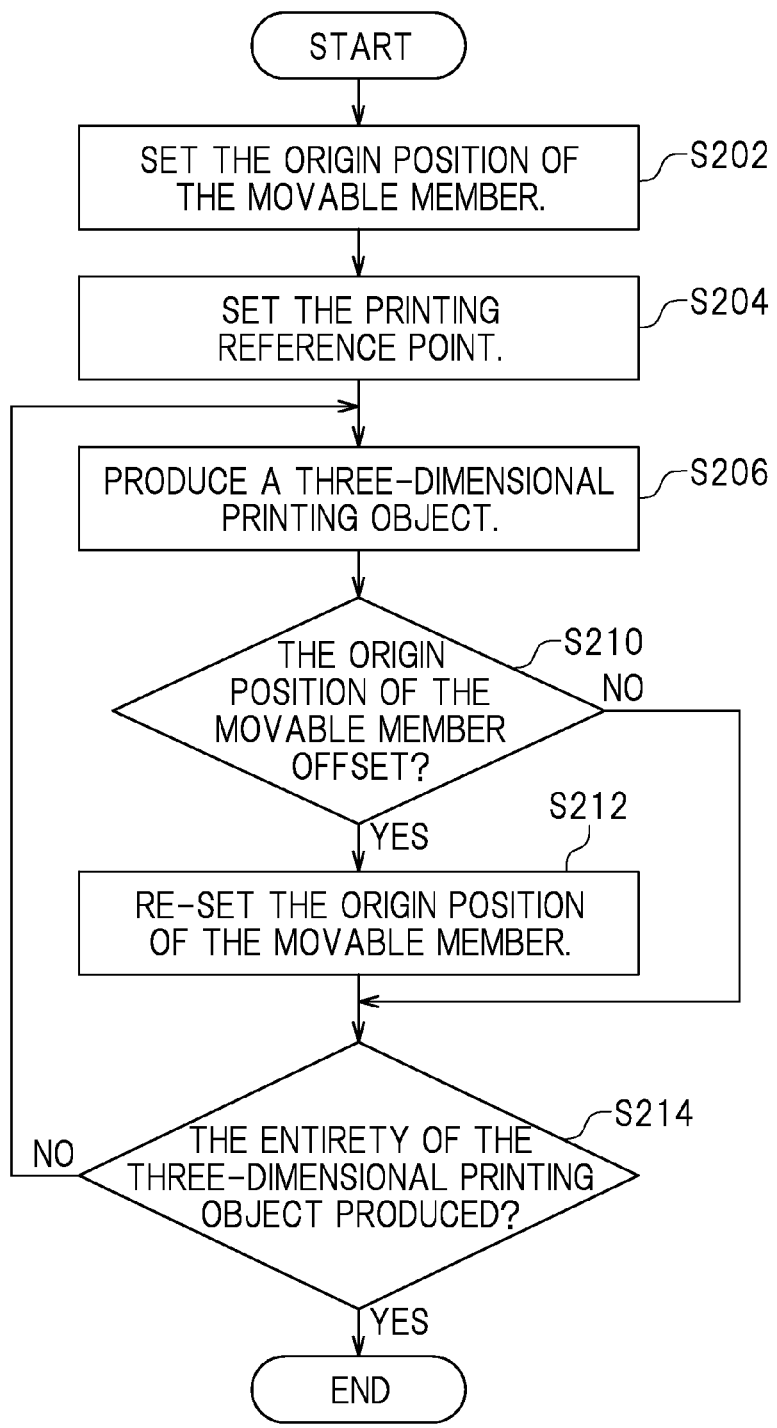
FIG. 3 is a flowchart showing a procedure of producing a three-dimensional printing object.
Figure 4A:
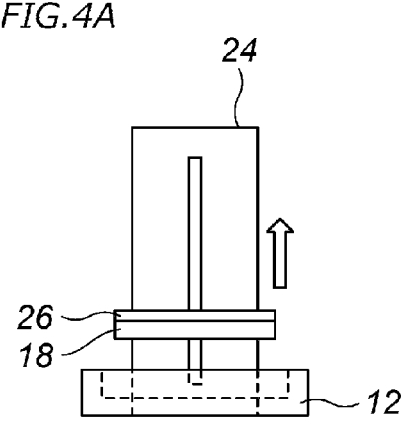
FIG. 4A through FIG. 4E show a procedure of processes of setting an origin position of a movable member.
Figure 4B:
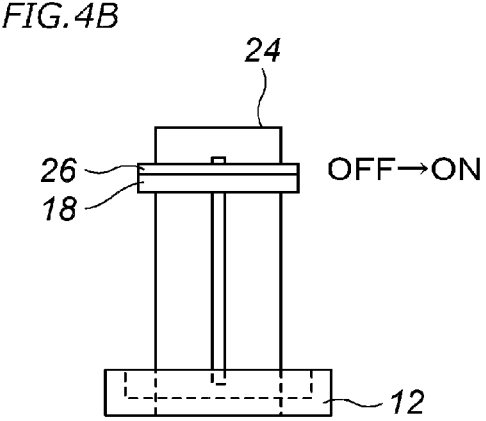
Figure 5A:
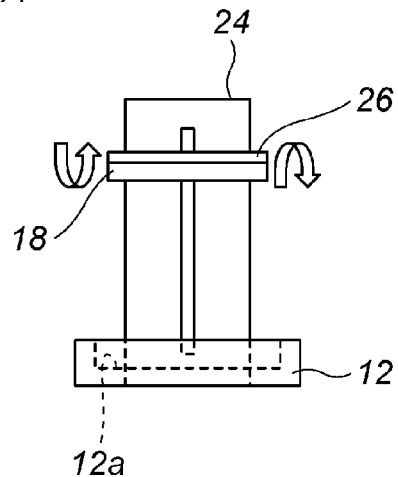
FIG. 5A through FIG. 5C show a procedure of processes of setting a printing reference point.
Figure 5B:
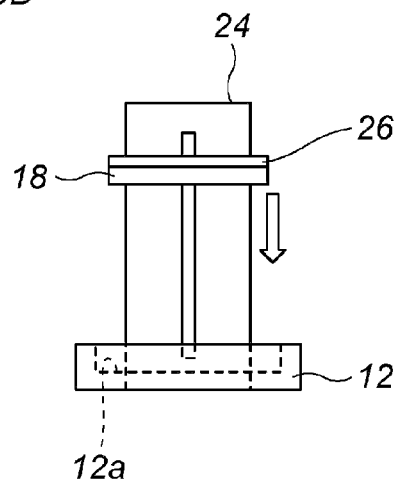
Figure 5C:
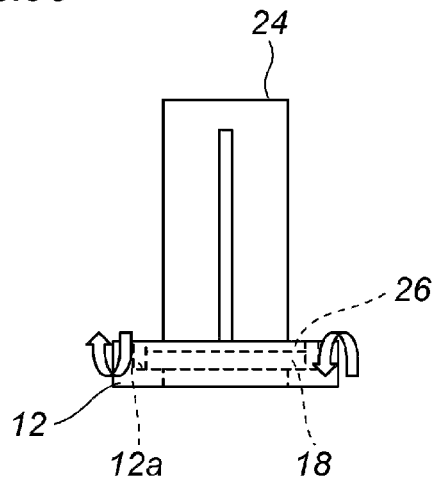
Figure 6:
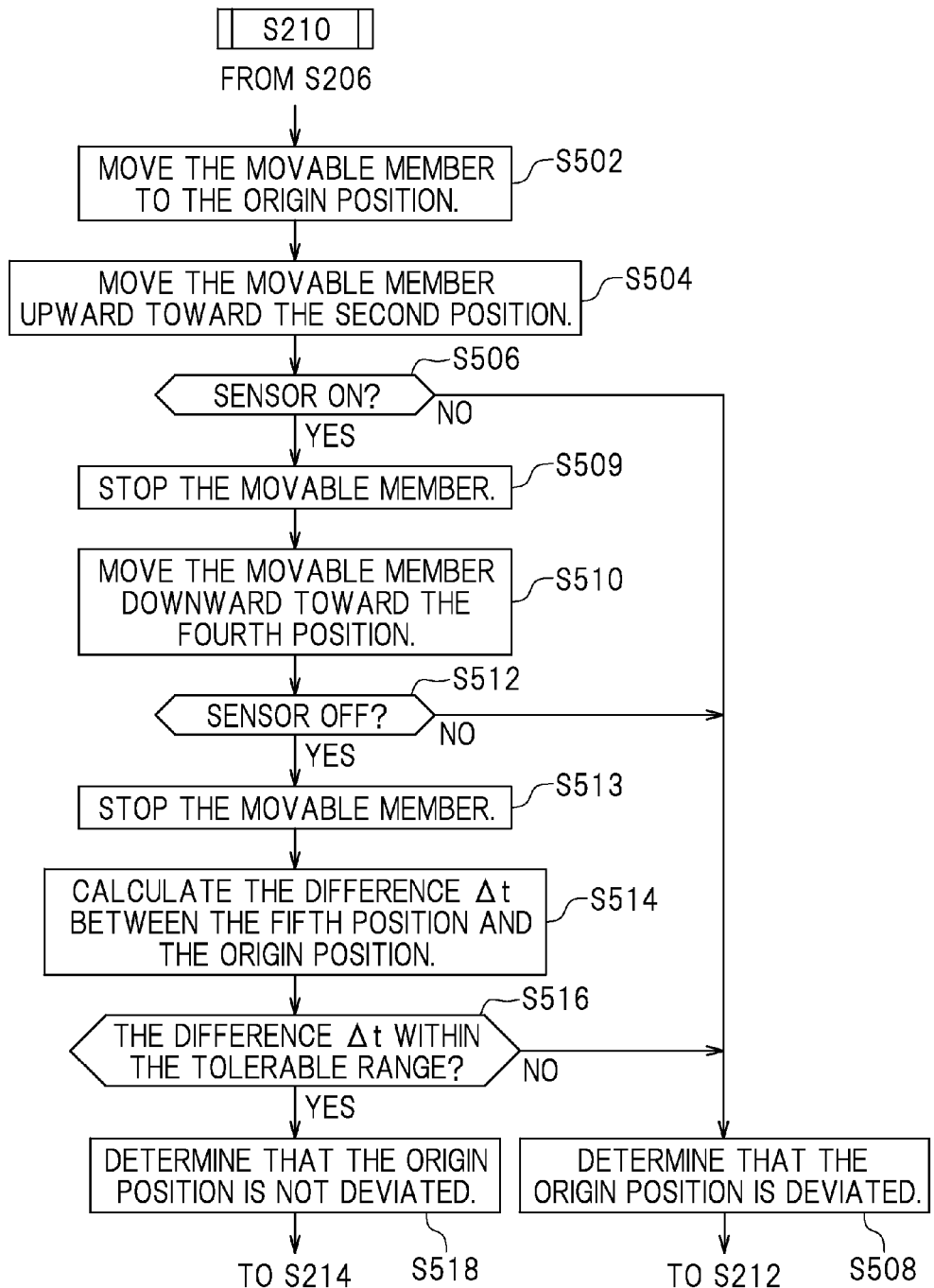
FIG. 6 is a flowchart showing a procedure of step S210 shown in FIG. 3 in detail.

FIG. 3 is a flowchart showing a method for producing a three-dimensional printing object. FIG. 4A through FIG. 4E show a procedure of processes of setting the origin position of the movable member 26. FIG. 5A through FIG. 5C show a procedure of processes of setting a printing reference point. FIG. 6 is a flowchart showing a procedure of determination processes. FIG. 7A through FIG. 7E show the procedure of the determination processes.

Upon issuance by an operator of an instruction to produce a three-dimensional printing object, first, the origin position P0 of the movable member 26 is set as shown in FIG. 3 (step S202).

The process of step S202 is performed as follows. First, as shown in FIG. 4A, the movable member 26 is moved upward from a position in the vicinity of the container 12. Then, after the upward movement of the movable member 26 is started, as shown in FIG. 4B, the upward movement of the movable member 26 is stopped at the time when the microcomputer 20 receives an "ON" signal from the sensor 30. The upward moving speed at which the movable member 26 is moved upward is relatively high, and is, for example, 15 mm/s. Since the upward moving speed is relatively high, there may be a time difference from when the sensor 30 outputs the "ON" signal until the movable member 26 is actually stopped. Therefore, the position at which the movable member 26 is stopped may be higher than the position of the movable member 26 at the moment when the sensor 30 outputs the "ON" signal.

Figure 4C:
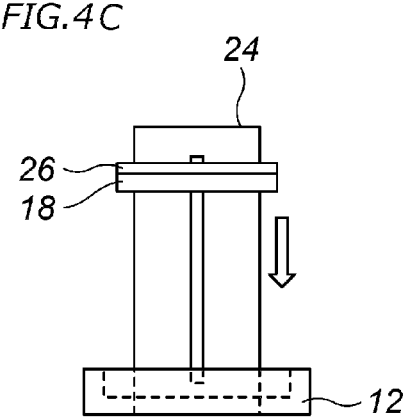
Figure 4D:
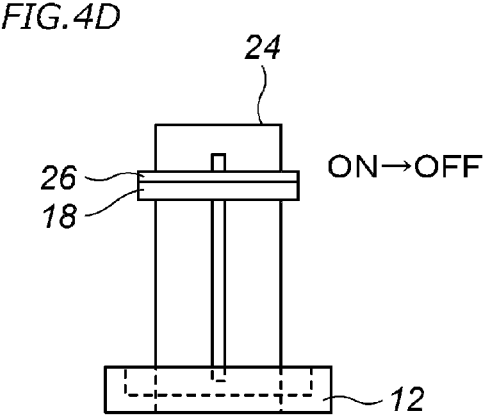

Next, as shown in FIG. 4C, the movable member 26 is moved downward. Then, after the downward movement of the movable member 26 is started, as shown in FIG. 4D, the downward movement of the movable member 26 is stopped at the time when the microcomputer 20 receives an "OFF" signal from the sensor 30. The downward moving speed at which the movable member 26 is moved downward is set to be lower than the upward moving speed. The downward moving speed of the movable member 26 is relatively low, and is, for example, 1 mm/s. Since the downward moving speed is relatively low, the time difference from when the sensor 30 outputs the "OFF" signal until the movable member 26 is actually stopped is very small. Therefore, the position at which the movable member 26 is stopped is the same as the position of the movable member 26 at the moment when the output from the sensor 30 is switched from ON to OFF. The position at which the movable member 26 is stopped is the first position P1 described above.

Figure 4E:
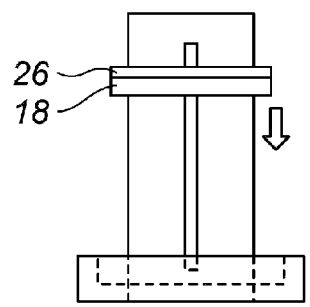

Then, as shown in FIG. 4E, the movable member 26 is moved downward from the first position P1 by a first distance t1 (e.g., 3 mm). The position that is lower than the first position P1 by the first distance t1 is set as the origin position P0 of the movable member 26. Thus, the origin position P0 is set. The origin position P0 thus set is written to, and stored in, storage device 52.

Upon completion of the setting of the origin position P0 of the movable member 26, the printing reference point is set (step S204). The "printing reference point" is the position of the movable member 26 at the time when the holder 18 contacts the bottom plate 12a of the container 12.

The printing reference point is set as follows. First, the operator loosens the screws 28 to allow the holder 18 secured to the securing portion 32 to be movable upward and downward (see FIG. 5A). The range in which the holder 18 is movable with respect to the securing portion 32 is predetermined based on the length, in an up-down direction, of the long holes 32a.

Upon issuance by an operator of an instruction to start setting the printing reference point, as shown in FIG. 5B, the movable member 26 is moved downward by a predetermined distance T. The predetermined distance T is set to a distance with which the bottom plate 18a of the holder 18 may contact the bottom plate 12a of the container 12. The predetermined distance T is, for example, 80 mm. After the movable member 26 is moved downward by the predetermined distance T, as shown in FIG. 5C, the screws 28 are tightened in the state where the bottom plate 18a of the holder 18 and the bottom plate 12a of the container 12 contact each other. The position of the movable member 26 at this moment is the printing reference point.

Upon completion of the setting of the origin position P0 and the printing reference point of the movable member 26 performed in this manner, a three-dimensional printing object is produced (step S206). The production of the three-dimensional printing object is performed by the printing control device 51. The process of step S206 is performed as follows. First, image data is output from the printing control device 51 of the microcomputer 20 to the projector 16. The image data is data stored in advance on the microcomputer 20, and represents an image of each of a plurality of layers obtained as a result of the three-dimensional printing object to be produced being divided along horizontal planes. Image data for one layer is output at a certain time interval from the printing control device 51 to the projector 16. An image is projected toward the photocurable resin 7 below the holder 18, and a cured layer based on the image is formed. Then, the holder 18 is moved upward by the thickness of the layer to be cured next, and the image data for the layer to be cured next is output from the printing control device 51 to the projector 16. The projector 16 projects an image for the layer to be cured next toward the photocurable resin 7 below the cured layer formed immediately previously. As a result, the newly cured layer is formed below the cured layer formed immediately previously. Such an operation is repeated to form a plurality of cured layers below the holder 18, and thus a portion of the three-dimensional printing object (represented by reference numeral 8 in FIG. 7A) is produced.

Upon production of the portion of the three-dimensional printing object 8, a process of determining whether or not deviation from the origin position P0 of the movable member 26 has occurred is performed (step S210). The procedure of determination processes is performed by the determination device 53.

Figure 7A:
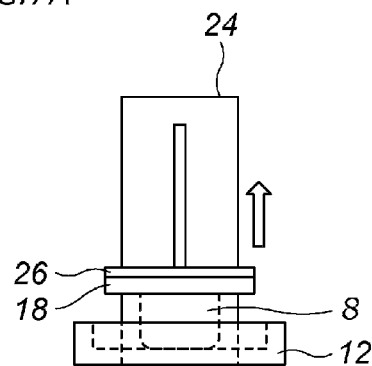
FIG. 7A through FIG. 7E show the procedure of determination processes.
Figure 8:
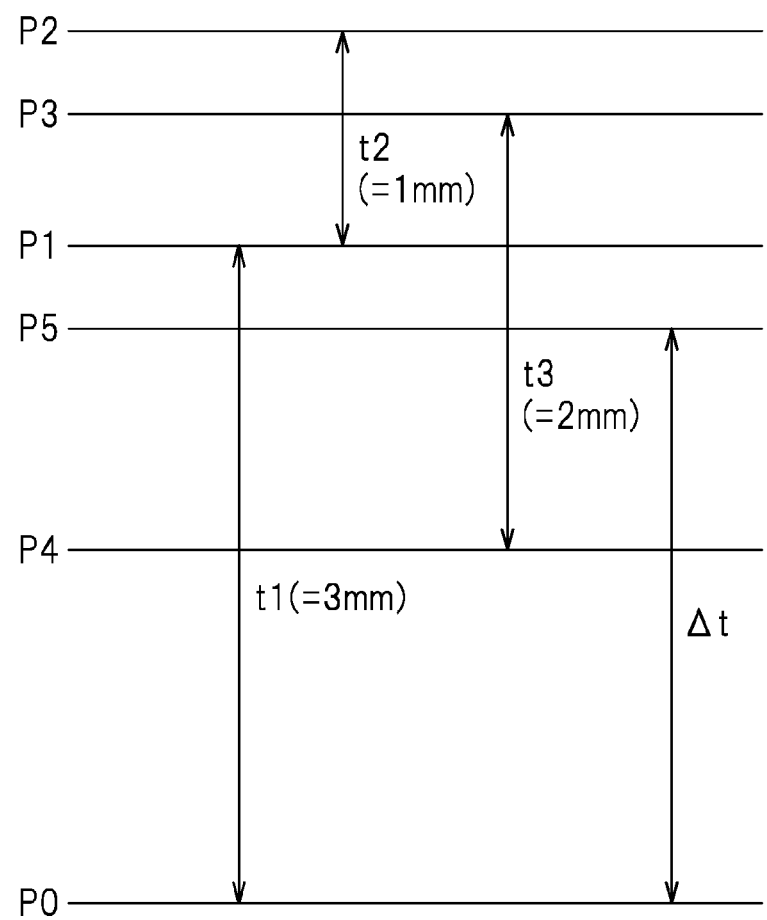
FIG. 8 shows the positional relationship among the origin position and first through fifth positions.

The flowchart in FIG. 6 shows the procedure of step S210 in detail. FIG. 8 shows the positional relationship among the origin position P0 and positions P1 through P5 described below. This procedure is performed as follows. First, as shown in FIG. 7A, the first moving unit 61 moves the movable member 26 to the origin position P0 (step S502). The "origin position P0" described regarding step S210 should be the origin position P0 stored in the storage device 52, but may possibly be deviated from the true origin position as a result of the process of step S206 being performed.

Figure 7B:
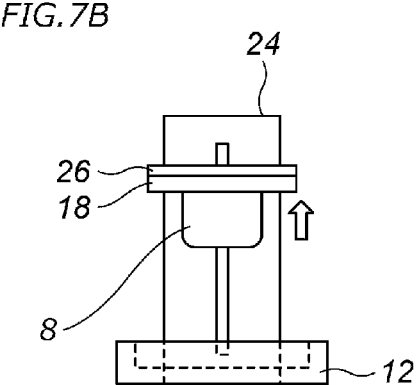

Next, as shown in FIG. 7B, the second moving unit 62 moves the movable member 26 toward a second position P2, which is higher than the origin position by a total distance of the first distance t1 and a second distance t2 (step S504). The upward moving speed at which the movable member 26 is moved upward is relatively high, and preferably is, for example, 15 mm/s. In this preferred embodiment, the second distance t2 is set to be shorter than the first distance t1. t1 preferably is set to 3 mm, and t2 preferably is set to 1 mm, for example. Therefore, the second position P2 preferably is set to a position that is higher than the origin position by 4 mm, for example.

Figure 7C:
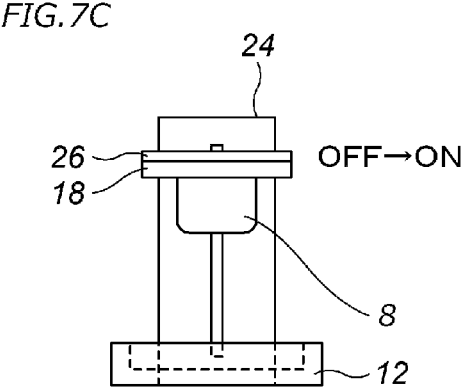

Next, in step S506, it is determined whether or not the output from the sensor 30 has been switched from OFF to ON. In other words, it is determined whether or not the sensor 30 has output an "ON" signal. In the case where the origin position P0 is not deviated, the output from the sensor 30 is switched to ON at the time when the movable member 26 passes the first position P1 that is higher than the origin position P0 by the first distance t1 as shown in FIG. 7C. If the output from the sensor 30 is not switched to ON even though the movable member 26 reaches the second position P2 that is higher than the origin position P0 by the distance t1+t2, this indicates that the origin position P0 is deviated downward. Therefore, in the case where the output from the sensor 30 is not switched to ON even though the movable member 26 reaches the second position P2, in other words, in the case where the determination result of step S506 is No, it is determined in step S508 that the origin position P0 is deviated and the procedure advances to step S212. The processes of step S506 and step S508 are performed by the first determination unit 66.

In contrast, in the case where the output from the sensor 30 is switched to ON as shown in FIG. 7C, in other words, in the case where the determination result of step S506 is Yes, the first stop unit 64 stops the movement of the movable member 26 (step S509). Hereinafter, the position at which the movable member 26 is stopped in step S509 will be referred to as a "third position P3".

Figure 7D:
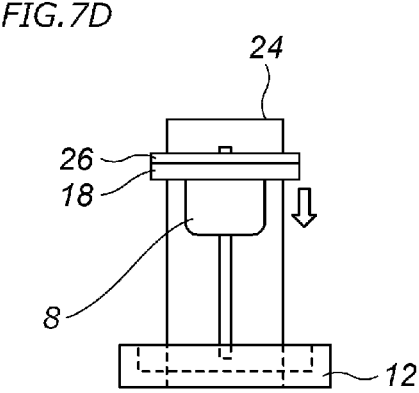

Next, as shown in FIG. 7D, the third moving unit 63 moves the movable member 26 downward toward a fourth position P4, which is lower than the third position P3 by a third distance t3 (step S510). The downward moving speed at which the movable member 26 is moved downward is set to be lower than the upward moving speed in step S504. The downward moving speed is relatively low, and preferably is, for example, 1 mm/s. In this preferred embodiment, the third distance t3 is set to be longer than the second distance t2. The third distance t3 is set to be shorter than the first distance t1. In this preferred embodiment, t1 preferably is set to 3 mm, t2 preferably is set to 1 mm, and t3 preferably is set to 2 mm, for example.

Next, in step S512, it is determined whether or not the output from the sensor 30 has been switched from ON to OFF. In other words, it is determined whether or not the sensor 30 has output an "OFF" signal. In the case where the origin position P0 is not deviated, the fourth position P4 is lower than the first position P1 (see FIG. 8). Therefore, if the output from the sensor 30 is not switched to OFF even though the movable member 26 reaches the fourth position P4, this indicates that the origin position P0 is deviated upward. Therefore, in the case where the output from the sensor 30 is not switched to OFF even though the movable member 26 reaches the fourth position P4, in other words, in the case where the determination result of step S512 is No, it is determined in step S508 that deviation from the origin position P0 has occurred and the procedure advances to step S212. The processes of step S512 and step S508 are performed by the second determination unit 67.

Figure 7E:
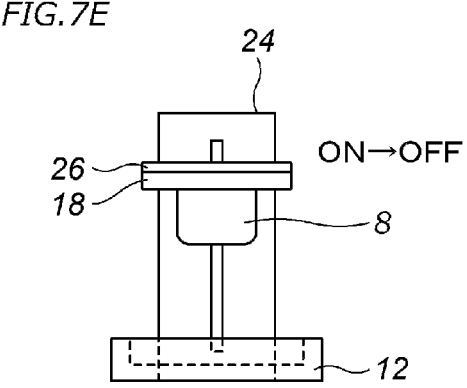

In contrast, in the case where the output from the sensor 30 is switched to OFF as shown in FIG. 7E, in other words, in the case where the determination result of step S512 is Yes, the second stop unit 65 stops the movement of the movable member 26 (step S513). Hereinafter, the position at which the movable member 26 is stopped in step S513 will be referred to as a "fifth position P5".

Next, the calculation unit 69 calculates a difference Δt between the fifth position P5 and the origin position P0 (step S514). In this preferred embodiment, the driving device 5 preferably is a servo motor, and the calculation unit 69 receives position information from the servo motor. The calculation unit 69 calculates the difference Δt based on the position information.

Next, in step S516, it is determined whether or not the difference Δt is within a predefined tolerable range. In the case where deviation from the origin position P0 has not occurred, the difference Δt between the fifth position P5 and the origin position P0 is Δt=t1. The tolerable range may be, for example, t1−α or greater and t1+α or less. In the case where, for example, t1=3 mm and α=0.5 mm, the tolerable range is 2.5 mm to 3.5 mm inclusive. In the case where the difference Δt is determined to be outside the tolerable range, it is determined in step S508 that deviation from the origin position P0 has not occurred and the procedure advances to step S212. The processes of step S516 and step S508 are performed by the third determination unit 68.

In contrast, in the case where the difference Δt is determined to be within the tolerable range, it is determined in step S518 that deviation from the origin position P0 has not occurred. The procedure advances to step S214.

As shown in FIG. 3, in step S212, the origin position P0 is re-set. More specifically, the origin position update device 54 rewrites the origin position P0 stored in the storage device 52 with a new origin position P0. In step S212, substantially the same process as that in step S202 is performed (see FIG. 4).

The process of step S212 is performed as follows. First, the re-moving unit 71 moves the movable member 26 to the first position P1. In more detail, the movable member 26 is moved upward until the output from the sensor 30 is switched from OFF to ON. When the output from the sensor 30 is switched to ON, the movement of the movable member 26 is stopped. Next, the movable member 26 is moved downward until the output from the sensor 30 is switched to OFF. The downward moving speed at which the movable member 26 is moved downward is lower than the upward moving speed at which the movable member 26 is moved upward. For example, the upward moving speed preferably is 15 mm/s, and the downward moving speed preferably is 1 mm/s. When the output from the sensor 30 is switched to OFF, the movement of the movable member 26 is stopped. The position at which the movable member 26 is stopped is set as the "first position P1". Next, the downward moving unit 72 moves the movable member 26 to a position that is lower than the first position P1 by the first distance t1. The update unit 73 sets the position that is lower than the first position P1 by the first distance t1 as the new origin position P0 (post-update origin position) P0. The new origin position P0 is stored in the storage device 52.

In the case where it is determined in step S210 that deviation from the origin position P0 has not occurred, or in the case where the origin position P0 is re-set in step S212, the procedure advances to step S214. In step S214, it is determined whether or not the entirety of the three-dimensional printing object has been produced.

In the case where it is determined in step S214 that the entirety of the three-dimensional printing object has not been produced, the procedure returns to step S206, and another portion of the three-dimensional printing object is produced by the printing control device 51. Then, the processes of steps 210 and thereafter are repeated. In contrast, in the case where it is determined in step S214 that the entirety of the three-dimensional printing object has been produced, the production of the three-dimensional printing object is terminated.

As described above, the three-dimensional printing apparatus 10 determines whether or not deviation from the origin position P0 of the movable member 26 has occurred. In other words, the three-dimensional printing apparatus 10 detects a deviation of the movable member 26. In the case where deviation from the origin position P0 has occurred, the three-dimensional printing apparatus 10 updates the origin position P0. In other words, the three-dimensional printing apparatus 10 automatically solves the deviation from the origin position P0 with no operation by the operator.

The above-described preferred embodiment is merely an example, and the present invention may be carried out in any of various other preferred embodiments.

In the above-described embodiment, the determination whether the origin position P0 is not deviated in step S210 and the re-setting of the origin position P0 in step S212 preferably are performed before the entirety of the three-dimensional printing object is produced. However, the determination and the re-setting may be performed after the entirety of the three-dimensional printing object is produced. Alternatively, the determination and the re-setting may be performed before and after the entirety of the three-dimensional printing object is produced.

The values of t1, t2, t3 and α are not limited to the above-described values, and may be set arbitrarily.

In the above-described preferred embodiment, the projector 16 preferably projects an image toward the photocurable resin 7 stored in the container 12 via the mirror 14. The present invention is not limited to this. The mirror 14 is not absolutely necessary. The projector 16 may directly project an image toward the photocurable resin 7 without the mirror 14.

In the above-described preferred embodiment, in the case where deviation from the origin position P0 occurs, the origin position P0 is automatically updated with no operation by the operator. The present invention is not limited to this. For example, the determination result in step S210 may be displayed on a display device or the like and presented to the operator. Based on the determination result thus displayed, the operator may input an instruction to execute the process of step S212.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus, comprising:
    a base member that supports a container including a bottom plate that allows light to pass therethrough;
    a light source that emits light toward a photocurable resin stored in the container;
    a holder that is located above the container and suspends the photocurable resin in a cured state;
    a column provided on the base member;
    a movable member that is attached to the column so as to be movable upward and downward and has the holder secured thereto;
    a driving device that is coupled to the movable member and drives the movable member upward and downward;
    a sensor that detects whether a position of the movable member is equal to or higher than a first position or is lower than the first position;
    a storage device that stores an origin position set at a position lower than the first position by a first distance; and
    a determination device that determines whether or not deviation from the origin position has occurred; wherein
    the determination device includes:
        a first moving unit configured or programmed to control the driving device to move the movable member to the origin position stored in the storage device;
        a second moving unit configured or programmed to control the driving device to move the movable member toward a second position, which is higher than the origin position stored in the storage device by a total distance of the first distance and a second distance; and
        a first determination unit configured or programmed to determine that deviation from the origin position stored in the storage device has occurred unless the sensor detects that the position of the movable member is equal to or higher than the first position before the movable member reaches the second position.

2. A three-dimensional printing apparatus according to claim 1, further comprising a printing control device that controls the light source and the driving device to produce a three-dimensional printing object formed by the photocurable resin being cured, the three-dimensional printing object being produced below the holder; wherein
    the determination device is configured or programmed to determine a deviation from the origin position after a portion of the three-dimensional printing object is produced by the printing control device.

3. A three-dimensional printing apparatus according to claim 1, further comprising an origin position update device including:
    a re-moving unit configured or programmed to control the driving device to move the movable member to the first position in a case that the first determination unit determines that deviation from the origin position has occurred;

a downward moving unit configured or programmed to control the driving device to move the movable member at the first position to a downward position that is lower than the first position by the first distance; and an update unit configured or programmed to store the downward position in the storage device as a post-update origin position.

4. A three-dimensional printing apparatus according to claim 3, further comprising a printing control device that controls the light source and the driving device to produce a three-dimensional printing object formed by the photocurable resin being cured, the three-dimensional printing object being produced below the holder; wherein the determination device is configured or programmed to determine a deviation from the origin position after a portion of the three-dimensional printing object is produced by the printing control device; and the printing control device is configured or programmed to produce another portion of the three-dimensional printing object after the update unit of the origin position update device stores the post-update origin position in the storage device.

5. A three-dimensional printing apparatus according to claim 1, wherein the determination device includes:

a first stop unit configured or programmed to stop the movement of the movable member by the second moving unit in a case that the sensor detects that the position of the movable member is equal to or higher than the first position before the movable member reaches the second position;

a third moving unit configured or programmed to, after the first stop unit stops the movement of the movable member, control the driving device to move the movable member toward a fourth position that is lower by a third distance than a third position at which the movable member is stopped; and a second determination unit configured or programmed to determine that deviation from the origin position stored in the storage device has occurred unless the sensor detects that the position of the movable member is lower than the first position before the movable member reaches the fourth position.

6. A three-dimensional printing apparatus according to claim 5, further comprising a printing control device that controls the light source and the driving device to produce a three-dimensional printing object formed by the photocurable resin being cured, the three-dimensional printing object being produced below the holder; wherein the determination device is configured or programmed to determine a deviation from the origin position after a portion of the three-dimensional printing object is produced by the printing control device.

7. A three-dimensional printing apparatus according to claim 5, further comprising an origin position update device including:

a re-moving unit configured or programmed to control the driving device to move the movable member to the first position in a case that the second determination unit determines that deviation from the origin position has occurred;

a downward moving unit configured or programmed to control the driving device to move the movable member at the first position to a downward position that is lower than the first position by the first distance; and an update unit configured or programmed to store the downward position in the storage device as a post-update origin position.

8. A three-dimensional printing apparatus according to claim 7, further comprising a printing control device that controls the light source and the driving device to produce a three-dimensional printing object formed by the photocurable resin being cured, the three-dimensional printing object being produced below the holder; wherein the determination device is configured or programmed to determine a deviation from the origin position after a portion of the three-dimensional printing object is produced by the printing control device; and the printing control device is configured or programmed to produce another portion of the three-dimensional printing object after the update unit of the origin position update device stores the post-update origin position in the storage device.

9. A three-dimensional printing apparatus according to claim 5, wherein a speed at which the third moving unit moves the movable member is lower than a speed at which the second moving unit moves the movable member.

10. A three-dimensional printing apparatus according to claim 5, wherein the determination device includes:

a second stop unit configured or programmed to stop the movement of the movable member by the third moving unit in the case where the sensor detects that the position of the movable member is lower than the first position before the movable member reaches the fourth position;

a calculation unit configured or programmed to calculate, after the second stop unit stops the movement of the movable member, a difference between a fifth position at which the movable member is stopped and the origin position stored in the storage device; and a third determination unit configured or programmed to determine whether or not the difference is within a predefined tolerable range, and in a case that the difference is not within the predefined tolerable range, determine that deviation from the origin position stored in the storage device has occurred.

11. A three-dimensional printing apparatus according to claim 10, further comprising a printing control device that controls the light source and the driving device to produce a three-dimensional printing object formed by the photocurable resin being cured, the three-dimensional printing object being produced below the holder; wherein the determination device is configured or programmed to determine a deviation from the origin position after a portion of the three-dimensional printing object is produced by the printing control device.

12. A three-dimensional printing apparatus according to claim 10, further comprising an origin position update device including:

a re-moving unit configured or programmed to control the driving device to move the movable member to the first position in a case that the third determination unit determines that deviation from the origin position has occurred;

a downward moving unit configured or programmed to control the driving device to move the movable member at the first position to a downward position that is lower than the first position by the first distance; and an update unit configured or programmed to store the downward position in the storage device as a post-update origin position.

13. A three-dimensional printing apparatus according to claim 12, further comprising a printing control device that controls the light source and the driving device to produce a three-dimensional printing object formed by the photocurable resin being cured, the three-dimensional printing object being produced below the holder; wherein
the determination device is configured or programmed to determine a deviation from the origin position after a portion of the three-dimensional printing object is produced by the printing control device; and
the printing control device is configured or programmed to produce another portion of the three-dimensional printing object after the update unit of the origin position update device stores the post-update origin position in the storage device.

14. A three-dimensional printing apparatus, comprising:
a base member that supports a container including a bottom plate that allows light to pass therethrough;
a light source that emits light toward a photocurable resin stored in the container;
a holder that is located above the container and suspends the photocurable resin in a cured state;
a column provided on the base member;
a movable member that is attached to the column so as to be movable upward and downward and has the holder secured thereto;
a driving device that is coupled to the movable member and drives the movable member upward and downward;
a sensor that detects whether or not a position of the movable member is equal to or higher than a first position or is lower than the first position;
a storage device that stores an origin position set at a position lower than the first position by a first distance;
a printing control device that controls the light source and the driving device to produce a three-dimensional printing object formed by the photocurable resin being cured, the three-dimensional printing object being produced below the holder; and
an origin position update device that updates the origin position stored in the storage device; wherein
the origin position update device includes:
a re-moving unit configured or programmed to control the driving device to move the movable member to the first position;
a downward moving unit configured or programmed to control the driving device to move the movable member at the first position to a downward position that is lower than the first position by the first distance; and
an update unit configured or programmed to store the downward position in the storage device as a post-update origin position;
the origin position update device is configured or programmed to update the origin position after a portion of the three-dimensional printing object is produced by the printing control device; and
the printing control device is configured or programmed to produce another portion of the three-dimensional printing object after the origin position update device updates the origin position.

\* \* \* \* \*